United States Patent [19]
Darrow et al.

[11] 4,040,159
[45] Aug. 9, 1977

[54] METHOD OF MANUFACTURE OF COOLED AIRFOIL-SHAPED BUCKET

[75] Inventors: Kenneth A. Darrow, Sprakers; Paul H. Kydd, Scotia; John W. Daly, Quaker Street, all of N.Y.

[73] Assignee: General Electric Company, Schenectady, N.Y.

[21] Appl. No.: 626,633

[22] Filed: Oct. 29, 1975

[51] Int. Cl.² .................................................. B23P 15/04
[52] U.S. Cl. ............................. 29/156.8 H; 416/97 R; 228/183; 228/118
[58] Field of Search .............. 29/156.8 B, 156.8 H, 29/424; 416/97, 97 A, 230, 229 A; 228/178, 183, 214, 215, 118

[56] References Cited
U.S. PATENT DOCUMENTS

| | | | |
|---|---|---|---|
| 1,147,233 | 7/1915 | Gibson | 416/230 |
| 2,022,562 | 11/1935 | Grumpelt | 416/230 |
| 2,161,533 | 6/1939 | Scholz et al. | 416/230 |
| 2,290,934 | 7/1942 | Andreasson | 228/189 |
| 2,641,439 | 6/1953 | Williams | 29/156.8 H |
| 3,032,316 | 5/1962 | Kramer | 416/230 |
| 3,067,982 | 12/1962 | Wheeler, Jr. | 29/156.8 H |
| 3,402,914 | 9/1968 | Kump et al. | 416/97 |
| 3,647,316 | 3/1972 | Moskowitz | 416/97 |

FOREIGN PATENT DOCUMENTS 116,461  3/1943  Australia ............... 416/230

Primary Examiner—C.W. Lanham
Assistant Examiner—Daniel C. Crane
Attorney, Agent, or Firm—Paul R. Webb, II; Joseph T. Cohen; Jerome C. Squillaro

[57] ABSTRACT

A method of forming an airfoil-shaped body is described which includes providing a core with cooling channels recessed into the surface thereof, affixing a calendered multilayer flexible mesh screen substrate to the surface of the core, applying braze alloy and brazing the assembly thereby filling completely the mesh screen pores and bonding further the mesh member substrate to the core, and applying an erosion-corrosion resistant layer over the brazed mesh member substrate completing the airfoil-shaped body.

5 Claims, 1 Drawing Figure

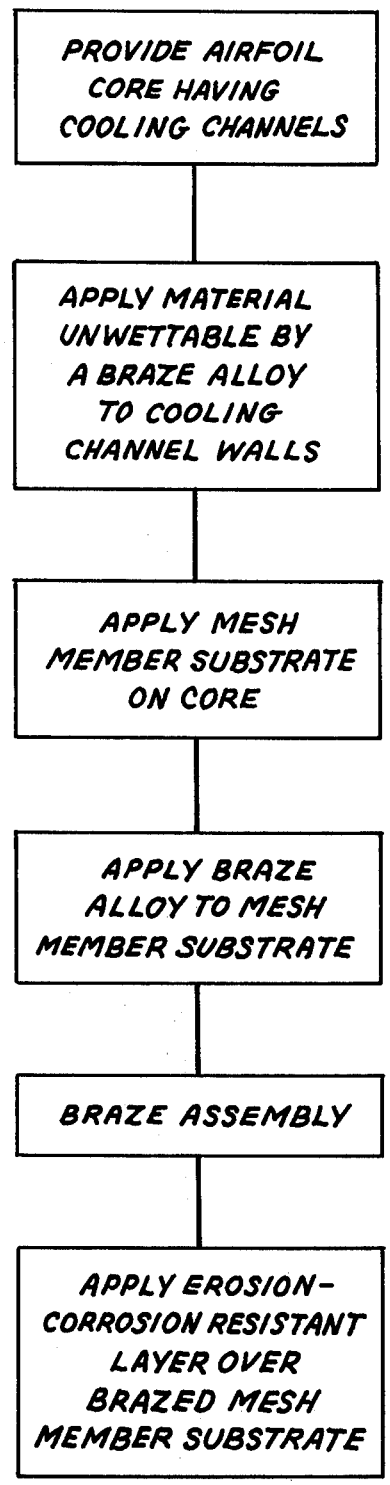

METHOD OF MANUFACTURE OF COOLED AIRFOIL-SHAPED BUCKET

This invention relates to improved methods of manufacture of cooled non-linear airfoil-shaped buckets, such as turbine and compressor blades.

A general process for producing a turbine or compressor blade having a plurality of passages therein relatively close to the surface for the passage of fluid therethrough for cooling the blade is set forth in U.S. Pat. No. 2,641,439 - Williams.

The Williams patent provides that in forming a turbine blade the surface of the core has formed therein a pluraliity of grooves separated by ridges. Cover for these grooves to provide closed channels for the conduct of cooling fluid during use is provided by plating a layer of metal over the bucket core, the grooves first being filled with a material such as aluminum, cadmium or a graphite-containing wax. Thereafter, one or more layers of metal are deposited thereover by electrodeposition forming the skin.

Next, the skin having been deposited and bonded in place, the patent describes the removal of the filler material to leave open passages defined by the grooves and the metal skin deposited thereover. According to the directions, when the filler material is aluminum, it would be removed by reaction with caustic soda. When the filler material is cadmium, it would be removed by heating to vaporization. When the filler material is a graphite-containing wax, it would be removed by melting.

The Williams' process can be successfully employed when the cooling channels are substantially larger in cross section than the capillary-size passageways employed in the liquid cooled turbine buckets described in U.S. Pat. No. 3,446,481 - Kydd, which patent and its subject matter is hereby incorporated by reference. The subject Kydd patent is assigned to the same assignee as the present application. It is particularly important that no plugging of the capillary size coolant channels occur to retard the flow of liquid coolant therethrough, because such turbines are intended to operate at very high temperatures and failure to cool any portion or portions of the blade surface can have very serious consequences.

In the Williams patent the airfoil skin is produced in situ, as by electroplating. However, when the normal hydrogen or vacuum brazing process is employed to braze preformed skins to airfoil cores, the process renders all of the surfaces present clean (free of oxides or other contaminants). The braze material is free to and does flow over these surfaces. Blockage of cooling channels can occur by entry of molten braze material into the coolant channels.

In U.S. Pat. No. 3,402,914 - Kump et al there is described a method of controlling the permeability of a porous material, and turbine blade formed thereby. A transpiration cooled turbine blade is discussed which has a porous sheath mounted on a load-carrying strut with selected portions of the sheath being reduced subsequently in permeability. This is accomplished by depositing material selectively on the sheath to obstruct the pores in one or more areas of the sheath. The coolant is fed to the interior of the blade and bled through the porous sheath.

In copending U.S. Pat. application Ser. No. 600,306 - Darrow filed July 30, 1975, there are set forth procedures, which will be described later in this application, for preparing the airfoil core including its channels prior to the application of the flexible mesh member substrate in the present invention.

In copending U.S. Pat. application Ser. No. 626,633 - Darrow and Daly filed Oct. 29, 1975, there is set forth an improved method of manufacture of cooled turbine or compressor buckets wherein a substrate layer, such as a thin metallic subskin, is applied to the core surface after which hot deformable particulate material is applied to the substrate.

In copending U.S. Pat. application Ser. No. 618,458 - Darrow and Smith filed Oct. 1, 1975, there is set forth a flexible metallic mesh member skin, which will be described later in this application, for providing a substrate in the present invention. All three of the above copending patent applications are assigned to the same assignee as the present application.

As opposed to the above patents and applications, the present invention is directed to an improved method of manufacture of a cooled non-linear airfoil-shaped body which has a recessed core covered by a calendered multi-layer flexible mesh member substrate which is brazed. A corrosion resistant layer adheres to the brazed substrate or to a layer of metal adhering to the brazed substrate.

The primary object of our invention is to provide an improved method of manufacture of a cooled non-linear airfoil-shaped body with a resultant tightly-fitting skin.

In accordance with one aspect of our invention, a method of forming a cooled non-linear airfoil-shaped body includes providing a recessed core covered by a calendered multilayer flexible mesh substrate, applying braze alloy and brazing thereby filling completely the mesh substrate pores, and applying a corrosion resistant layer over the brazed mesh member substrate.

These and various other objects, features and advantages of the invention will be better understood from the following description taken in connection with the drawing in which:

The single FIGURE of the drawing is a process flow chart of forming an airfoil-shaped body in accordance with our invention.

In the single FIGURE of the drawing, there is shown a process flow chart of a method of forming an airfoil-shaped body in accordance with our invention. This method comprises providing an airfoil core having cooling channels recessed into the surface thereof, applying material unwettable by a braze alloy to cooling channel walls, applying a calendered multi-layer flexible mesh member substrate on the core, affixing the mesh member substrate to the core, applying braze alloy to the mesh member substrate, brazing the assembly thereby filling completely the mesh member pores and bonding further the mesh member substrate to the core, and applying an errosion-corrosion resistant layer over the brazed mesh member substrate completing the airfoil-shaped body.

The airfoil-shaped body has an airfoil core with a platform portion and a root structure. The core with the platform portion has a plurality of cooling channels recessed into the surface thereof. As it is described in the above-identified copending application Ser. No. 600,306, brazing of pre-formed skins on airfoil cores for the manufacture of nozzle partitions, turbine buckets or compressor blades is conducted in a dry hydrogen atmosphere or in a vacuum and all of the surfaces present are clean, free of oxides and other contaminants. Under these conditions the molten braze alloy is free to, and it does, flow over these surfaces at random with preferential flow being to the cleanest areas. Flow of the molten alloy into cooling channel recesses can obstruct or block the passage of coolant therethrough.

Having determined the mechanism by which the obstruction cooling channels by braze material is promoted, in the practice of the present invention before the calendered multilayer flexible mesh member substrates are applied on the airfoil cores, the surfaces of the cooling channel walls are provided with a layer of oxide material. The oxide formation selected for this purpose must be one that is stable, not reducible, in dry hydrogen, such as, aluminum oxide, titanium oxide, or zirconium oxide. Thereafter, during conduct of the brazing operation, the oxide-covered sides of the cooling channels is not wet by the molten braze alloy and plugging of the cooling channels, now covered, during manufacture is greatly reduced. Plugging of these channels by braze material is substantially eliminated.

When the airfoil core is made of an alloy having as constituents, one or more elements such as aluminum or titanium, that can form surface oxides that are nonreducible in dry hydrogen, the airfoil core is fired in the furnace in air at about 400° C for a short period of time, such as about 1 hour. The entire surface of the airfoil core will now be covered with a thin layer of non-reducible oxide. Typically alloy compositions that may be treated in this manner are Inconel 718, Inconel 738 and U500 or any others containing similar amounts of alumimun and/or titanium.

Next, the recessed cooling channels are filled with a readily depolymerizable polymer filler. This filler is applied by painting into the channels with a small camel's hair brush, permitting each application to dry before applying more. This deposition is repeated until the channels have been filled, or overfilled, enough to withstand subsequent cleaning processes without exposing the oxide layer covering the channel surfaces. The airfoil core surface is then abraded, as with a belt sander, to remove any polymer filler and all of the oxide formation from the top of the lands between the cooling channels. Next, the airfoil core is bead blasted to remove excess polymer filler and oxide formation from small surface cavities missed in the abrading operation, the bead blasting also serving to roughen the surface of the lands.

The abrading and bead blasting operations will have exposed and cleaned only the tops of the lands and, preferably, the airfil core next receives an electroplated coat of bright nickel, such as 0.5 mil coating, only on these exposed areas.

At this point in the process the polymer filler may be removed from the channels, as described hereinbelow, but this is optional. If there is need for extra support for the airfoil substrate, which is to be applied next during the skinning operation, the polymer material may be left in place for removal during the brazing operation. Removal of the polymer filler is quickly, about 30 seconds, accomplished in a vapor degreaser where it is exposed to, and dissolved by, hot solvent, such as trichloroethylene vapors.

As it is described in the above-identified copending application Ser. No. 618,458 a flexible metallic mesh member skin is used as a substrate. This substrate comprises multilayer flexible metallic mesh members selected from the group consisting of two or three such members. The members are interlocked mechanically by rolling or calendering in a conventional fashion to provide a reduced thickness, are annealed, and provide a low porosity.

The problem in skinning an airfoil-shaped body such as a bucket has always been to make the skin fit the core exactly so that it could be brazed readily, have all of the cooling passages water tight and without filling any of the channels with braze alloy. In previous process, it has been necessary to preform the skin using dies, a sheet metal brake, a drift and hammer, or using some form of external pressure on the skin during brazing to make it conform to the core or casting surface contours. In our invention the mesh member substituted for a metal skin can be easily wrapped around a casting by hand and stretched if necessary to make the skin fit in intimate contact with the core or casting.

The welding current required is much lower than for sheet metal of equivalent thickness. A lower current means less distortion of the skin during spot welding, a lessened possibility of burning holes in the wire mesh during spot welding, and a smoother substrate on which to build the skin. The braze alloy is placed on top of the skin and must run through the mesh member before it can get into the channels to plug them. This is in contrast to previous methods of placing the brace alloy under the skin or in the channels and expecting it to flow along the skin and braze the skin fast.

The flexible metallic mesh member substrate is provided by two or three flexible metallic mesh members which were interlocked mechanically. The resulting skin was of reduced thickness, annealed and of low porosity. Such mesh members can be of material such as screen or cloth and of various metals such as nickel, monel alloy, or stainless steel. When two or three such members are formed into a flexible screen, the resulting structure is stretchable and has low porosity. A single screen which is rolled and annealed fails to provide these advantages. If more than three such members are employed in an attempt to make a flexible skin, the mechanical interlocking is mechanically difficult if not impossible and results in a product which loses its flexibility and stretchability.

The flexible metallic mesh members are initially degreased and then acid cleaned befoe calendering to prevent rolling oxides and other residue into the substrate. Two or three such metallic mesh members are then calendered to at least one-half of the total initial thickness by rolling in a conventional rolling mill. The flexible metallic mesh member substrate is degreased and annealed by firing at a temperature of 1000° C in dry hydrogen to remove any oxides and to anneal for maximum flexibility. The substrate is then cut to fit the core.

During the calendering, the mesh members were mechanically interlocked whereby the wires of one layer of the mesh member were crimped and forced into the pores of the adjacent layer or layers. The resultant substrate is flexible and of low porosity.

The substrate is fitted tightly over the surface of the core including the platform portion. Then, the substrate is spot welded to the lands of the core thereby covering the airfoil coil. The flexibility of the multilayer flexible mesh member substrate provides for necessary stretching and tight fit.

Braze alloy is applied to mesh member substrate. Preferably the braze alloy is Nicrobraz 30 alloy having a composition by weight of 19% chromium, 10.2% silicon and 70.8% nickel which is manufactured by the Wall Colmonoy Corporation. Such an alloy is preferably employed in the form of transfer tape applied to the exterior surface of the substrate. The assembly is then fired in a dry hydrogen atmosphere at a temperature of 1200° C thereby filling completely the mesh member pores of the substrate and bonding further the substrate to the surfacce of the core. Brazing in dry hydrogen cleans up any oxides formed during the spot welding and promotes the uniform flow of the braze alloy over the surface of the substrate. An erosion-corrosion resistant layer can then be applied over the brazed mesh member substrate. A suitable erosion-corrosion resistant layer is Nicrocoat 2 alloy having a composition of 4.5% silicon, 92.35% nickel, and 3.15% other constituents which is manufactured by the Wall Colmonoy Corporation. The alloy is brazed by firing in a dry hydrogen atmosphere at a temperature of 1050° C. Additionally, one or more layers of alloy transfer tape can be applied over the initial brazed substrate and then brazed to build up surface thickness. Further, one or more additional layers of erosion-corrosion resistant alloy can be applied and brazed to the initial erosion-corrosion resistant layer.

We found further that we could provide another improved method of forming an airfoil-shaped body. The initial steps of the first method described above are employed through the step of brazing Nicrobraz 30 alloy to the mesh metallic member substrate. The thickness of the skin is then built up by applying a layer of metal over the brazed substrate. An erosion-corrosion resistant layer is then applied over the layer of metal. In this latter method, 20 mils of copper can be diffusion bonded at 1000° C to the brazed substrate to provide the metal layer. The outer surface of the copper layer can then be coated with 347 stainless steel for the erosion-corrosion resistant layer thereby providing a skin thickness of about 50 mils. The airfoil is fired in hydrogen at 1000° C to provide stress relief and to bond the stainless steel to the copper. Finally, the airfoil is shaped to the extent necessary by grinding, belt sanding or machining. An aperture is provided at or near the tip of the airfoil-shaped body as a relief opening for coolant.

While other modifications of the invention and variations thereof which may be employed within the scope of the invention have not been described, the invention is intended to include such as may be embraced within the following claims:

What we claim as new and desire to secure by Letters Patent of the United States is:

1. A method of forming an airfoil-shaped body which comprises providing an airfoil core having cooling channels recessed into the surface thereof, applying material unwettable by a braze alloy to the surfaces of the cooling channel walls, applying a calendered multi-layer flexible mesh member substrate on the core, affixing the mesh member substrate to the core, applying braze alloy to the mesh member substrate, brazing the assembly thereby filling completely the mesh member pores and bonding further the mesh member substrate to the core, and applying an erosion-corrosion resistant layer over the brazed mesh member substrate completing the airfoil-shaped body.

2. A method as in claim 1, in which additional braze alloy is applied subsequently and brazed to the brazed substrate to increase surface thickness.

3. A method as in claim 2, in which at least one additional layer of an erosion-corrosion resistant layer is applied to the initial erosion-corrosion resistant layer.

4. A method as in claim 1, in which at least one additional layer of an erosion-corrosion resistant layer is applied to the initial erosion-corrosion resistant layer.

5. A method of forming an airfoil-shaped body which comprises providing an airfoil core having cooling channels recessed into the surface thereof, applying material unwettable by a braze alloy to the surfaces of the cooling channel walls, applying a calendered multi-layer flexible mesh member substrate on the core, affixing the mesh member substrate to the core, applying braze alloy to the mesh member substrate, brazing the assembly thereby filling completely the mesh member pores and bonding further the mesh member substrate to the core, applying a layer of metal over the brazed mesh member substrate, and applying an erosion-corrosion resistant layer over the layer of metal thereby completing the airfoil-shaped body.

* * * * *